(12) United States Patent
Clos

(10) Patent No.: US 10,470,618 B2
(45) Date of Patent: Nov. 12, 2019

(54) BODY CARE BRUSH

(71) Applicant: M+C Schiffer GmbH, Neustadt/Wied (DE)

(72) Inventor: Thomas Clos, Cologne (DE)

(73) Assignee: M+C SCHIFFER GMBH (DE)

( * ) Notice: Subject to any disclaimer, the term of this patent is extended or adjusted under 35 U.S.C. 154(b) by 335 days.

(21) Appl. No.: 15/314,705

(22) PCT Filed: May 28, 2015

(86) PCT No.: PCT/EP2015/061904
§ 371 (c)(1),
(2) Date: Nov. 29, 2016

(87) PCT Pub. No.: WO2015/181329
PCT Pub. Date: Dec. 3, 2015

(65) Prior Publication Data
US 2017/0188758 A1     Jul. 6, 2017

(30) Foreign Application Priority Data

May 30, 2014 (DE) .......................... 10 2014 008 318

(51) Int. Cl.
*A47K 7/04*     (2006.01)
*A46B 3/04*     (2006.01)
(Continued)

(52) U.S. Cl.
CPC .................. *A47K 7/04* (2013.01); *A46B 3/04* (2013.01); *A46B 5/0029* (2013.01);
(Continued)

(58) Field of Classification Search
CPC ........ A47K 7/028; A46B 3/04; A46B 5/0029; A46B 13/008; A46B 13/02
See application file for complete search history.

(56) References Cited

U.S. PATENT DOCUMENTS

| 6,178,582 B1 | 1/2001 | Halm |
| 2003/0154568 A1 | 8/2003 | Boland et al. |

(Continued)

FOREIGN PATENT DOCUMENTS

| DE | 19857032 A1 * | 7/1999 | ........... A46B 5/0025 |
| DE | 19857032 A1 † | 7/1999 | |

(Continued)

*Primary Examiner* — Shay Karls
(74) *Attorney, Agent, or Firm* — The Webb Law Firm

(57) ABSTRACT

A body care brush, in particular a facial brush, has a brush head, which contains a cleaning-element carrier that bears cleaning elements. The brush is able to efficiently clean body regions that are difficult to access. The body care brush is developed in such a way that the cleaning-element carrier is formed by at least two cleaning-element carrier parts, which are movably supported in relation to each other and which bear cleaning elements. A returning mechanism is provided between the cleaning-element carrier parts, by way of which the cleaning-element carrier parts are coupled to a base part. The base part is arranged centrally with respect to the cleaning-element carrier and on a side of the cleaning-element carrier facing away from the cleaning elements.

7 Claims, 3 Drawing Sheets

(51) Int. Cl.
    *A46B 5/00*     (2006.01)
    *A46B 13/00*    (2006.01)
    *A46B 13/02*    (2006.01)
    *A47K 7/02*     (2006.01)
    *B29C 45/14*    (2006.01)
    *B29C 45/16*    (2006.01)
    *B29K 101/12*   (2006.01)
    *B29L 31/42*    (2006.01)

(52) U.S. Cl.
    CPC ............ *A46B 13/008* (2013.01); *A46B 13/02* (2013.01); *A47K 7/028* (2013.01); *B29C 45/14385* (2013.01); *B29C 45/1615* (2013.01); *B29C 45/1676* (2013.01); *A46B 2200/1006* (2013.01); *B29C 2045/1693* (2013.01); *B29K 2101/12* (2013.01); *B29L 2031/425* (2013.01)

(56) References Cited

U.S. PATENT DOCUMENTS

| | | |
|---|---|---|
| 2012/0204369 A1 | 8/2012 | Watanabe et al. |
| 2013/0060176 A1 | 3/2013 | Nichols |

FOREIGN PATENT DOCUMENTS

| | | |
|---|---|---|
| DE | 10044031 A1 | 3/2002 |
| DE | 10326155 A1 | 12/2004 |
| DE | 10342127 A1 | 4/2005 |
| WO | 6827846 A1 | 7/1998 |
| WO | 2008121010 A1 | 10/2008 |

\* cited by examiner
† cited by third party

BODY CARE BRUSH

CROSS-REFERENCE TO RELATED APPLICATIONS

This application is the United States national phase of International Application No. PCT/EP2015/061904 filed May 28, 2015, and claims priority to German Patent Application No. 10 2014 008 318.7 filed May 30, 2014, the disclosures of which are hereby incorporated in their entirety by reference.

BACKGROUND OF THE INVENTION

Field of the Invention

The present invention relates to a body care brush, in particular a facial care brush, which contains a cleaning element carrier that bears cleaning elements.

Description of Related Art

In the prior art, for example, a face cleaning brush with a handle body and an exchangeable brush head is known, which is formed by a cleaning element carrier that bears bristle bundles. This face cleaning brush comprises an electric actuator, which drives the brush head. The brush head performs a combination movement of vibration and rotation during electric operation and thereby removes dirt, dead skin cells and make-up residues from the skin.

Furthermore, for example electrically operated toothbrushes are known in the prior art, on the brush head of which a cleaning element carrier having cleaning elements is provided, which for dental cleaning is set to rotate or oscillate.

In case of the above described face cleaning brushes and in case of known toothbrushes as well as usually for all types of body care brushes, it is a need to be able to clean also hardly accessible body regions and/or body regions with an uneven contour of the body surface as efficiently as possible.

From document DE 100 44 031 A1, a body care brush in form of a toothbrush is known with two semicircular cleaning-element carrier parts, which are pivotably supported about a rigid axis opposite to a base. For this purpose, the cleaning element carrier parts may either be pivotably coupled directly with one another via this pivot axis and be pivoted with the base or, however, may each be coupled individually to the base. The pivot axis may be coupled to a spring element so that during a pivoting movement a return occurs due to an external force. The design as a whole is very complex. Moreover, a considerable requirement is needed, since an axle beam forming the pivot axis is provided below the two cleaning-element carrier parts. Apart from that, the embodiment entails a limitation to two cleaning-element carrier parts on one brush head.

Document DE 103 26 155 A1 discloses a toothbrush with a plurality of cleaning-element carrier parts, which are each arranged at a distance from one another on an elastomer pad of a brush head of a toothbrush. The elastomer pad allows a certain pivoting movement of the cleaning-element carrier parts relative to one another. The pad is located below the cleaning-element carrier parts.

SUMMARY OF THE INVENTION

It is therefore an object of the present invention to provide a body care brush, which ensures an improved cleaning effect.

The above mentioned problem is solved with a body care brush according to the principles of the present invention.

The body care brush according to the invention is differentiating from the prior art due to the fact that a multi-part, i.e. at least a two-part cleaning-element carrier part is provided, whereby each part of a cleaning-element carrier, thus, every cleaning-element carrier part is suspended in a movably supported manner on a base part.

When viewed on a cleaning-element side surface of the cleaning-element carrier (in the following top view), the base part is essentially centered, i.e. centrally arranged.

The cleaning-element carrier parts are coupled to this base part. This coupling is performed by a returning means, which brings the individual cleaning-element carrier parts back into the initial position, after the brush has been removed from the body. For example, the cleaning-element carrier parts are brought into this initial position by elastic returning, after they have been pivoted, for example, by using the brush in a body contour-shaping manner in order to be able to pass a predetermined body contour.

In the initial position in top view, the cleaning-element carrier preferably comprises an essentially planar surface, whereby the individual cleaning-element carrier parts forming the cleaning-element carrier are essentially arranged perfectly aligned to one another on their cleaning-element side surface. According to the invention, the returning means is provided between the cleaning-element carrier parts, what regularly entails that the returning means for returning a pivoting movement of the cleaning-element carrier parts as a reaction to an external force affecting the cleaning elements, is located between a surface of cleaning-element carrier parts stuck out by the cleaning-element parts and a lower surface usually extending parallel thereto. Thereby, the returning means may additionally project above the lower surface in order to connect the cleaning-element carrier parts with a base part, which is provided with a distance to this lower surface. In respect to an embodiment, which is as space-saving as possible, however, the returning means is located exclusively or at least predominantly in clearances between adjacent cleaning-element carrier parts. In these clearances, there is usually provided at least 60%, preferably at least 70% of an elastic plastic, which uniformly forms the returning means and preferably connects this returning means to the base part.

Alternatively, depending on the intended use, it may also be preferred that the cleaning-element carrier in its initial position is configured convexly or concavely. Preferably here, individual planar configured cleaning-element carrier parts are already in the initial position attached tilted to the returning means. All or some bristle bundles forming cleaning elements in the initial position are preferably parallel to one another and parallel to a central rotation middle axis. The bristle bundles are preferably contoured or chamfered at their cleaning-side ends in such a way that they form a convex or concave enveloping surface, which is not projected above by the individual cleaning-side ends.

When using the brush on the body, the individual cleaning-element carrier parts move, in particular tilt in both, in vertical direction toward the cleaning-side surface, i.e. in a central direction of the cleaning-element carrier, as well as within the cleaning element side surface formed in the initial position. Essentially, the individual cleaning-element carrier parts, thus, tilt following the contour of the body region to be cleaned, while the brush is pressed against this body region.

Any means allowing a returning, in particular tilting in vertical direction to the cleaning surface as well as in horizontal direction to the cleaning surface, may be regarded as returning means.

Preferably, the returning means is formed by an elastic plastic member or the returning means merely is an elastic plastic member, which forms a connection between the base part and the respective cleaning-element carrier part. In particular, all the cleaning-element carrier parts, which are provided movably supported to one another, are preferably attached to the same uniform elastic plastic member.

The elastic plastic member usually is located between the cleaning-element carrier parts. According to a preferred embodiment, the elastic plastic member extends up to the surface of the cleaning-element carrier parts, which is stuck out by the cleaning elements and is preferably provided flush with this surface. Thereby, the elastic plastic member extends radially, i.e. from a rotation axis, usually forming the symmetry axis with regard to the surface configuration of the cleaning-element carrier, less far than the cleaning-element carrier parts. The elastic plastic member usually does not extend more than 25% of the radial extent of the cleaning-element carrier parts from this rotation axis. Preferably, the elastic plastic extends from the surface of the cleaning-element carrier parts up to their lower surface. Thus, at the lower surface of the cleaning-element carrier parts and the returning means opposite the cleaning elements, a planar even surface results, which is merely projected above by a base part, which is formed of a hard component, in particular PP or PE. The transition between the base part and said lower surface of the cleaning-element carrier parts with the returning means usually occurs via a change of bore. The base part regularly comprises a connection flange as well as a disk-like flange provided thereon, which is connected with the returning means in a material-bonded manner. This returning means usually is cylindrically formed with the disk-like flange. This cylinder connects the unity from returning means and cleaning-element carrier part.

Preferably, for the elastic plastic a thermoplastic elastomer (TPE) having a Shore A hardness between 10 and 100, particularly preferably between 20 and 70, most preferably between 20 and 30 or alternatively preferably between 30 and 50 is used. The elastic plastic member therefore in a side view of the brush head is preferably provided between the base part and the cleaning-element side surface and in top view between at least two cleaning element carrier parts.

This, however, does not exclude that the used plastic material also slightly projects above the cleaning-element side surface in the side view. Centered means that at least the center of mass of the elastic plastic member lies between the base part and the cleaning-element side surface.

According to a preferred embodiment of the invention, the elastic plastic member is injection-molded onto the cleaning-element carrier parts.

According to the method, the cleaning-element carrier parts are first positioned to one another in an injection-molding device in the desired arrangement of the finished brush, after they have preferably been produced by means of injection-molding technology in a cleaning-element carrier part injection-molding device. The thus initially preliminarily pre-positioned cleaning-element carrier parts by means of elastic plastic material combined with forming the elastic plastic member are back-, pre- and/or injection-molded, i.e. by means of an injection molding method, initially, liquid plastic material is injected onto the cleaning-element carrier parts, which cures and holds the individual cleaning-element carrier parts thereafter in a friction-locked manner, preferably also in three directions in a positively locked manner.

Particularly preferred, during the production of the cleaning-element carrier parts in the cleaning-element carrier part injection-molding device, in a base part injection-molding device, the base part is produced in particular at least partly simultaneously, thus, concurrently by means of injection-molding. Subsequently, in an injection device, the cleaning-element carrier parts and the base part are connected to one another combined with the production of the elastic plastic member.

According to a preferred embodiment of the invention, the cleaning-element carrier parts are preferably of the same size as cake piece-like units and form in their entirety an essentially round, i.e. circular cleaning-element carrier.

The cleaning-element carrier is essentially configured symmetrically (mirror-symmetrically or point-symmetrically). A circular arc segment-shaped base surface of a single cake piece-like unit in this sense is also provided, if in top view, individual peaks, in particular peaks of the cleaning-element carrier parts pointing toward the center, are flattened or rounded off. In top view, the enveloping surface of each individual cleaning-element carrier is to be essentially formed in the manner of a circular segment.

Preferably, between three and eight cleaning-element carrier parts are provided. The cleaning-element carrier parts are preferably configured identically. It may be provided an even number of cleaning-element carrier parts, in particular six, eight, or twelve similar cleaning-element carrier parts, which form the cleaning-element carrier.

Preferably, at top view, in the center of the circular cleaning-element carrier, a cylindrical, in particular circular clearance is left, which at least partially is filled with the elastic plastic member forming the returning means and essentially terminates flush to the surface of the cleaning-element side surface.

The individual cleaning-element carrier parts are preferably spaced from one another by a clearance. In particular, the clearances between all the cleaning-element carrier parts forming the cleaning-element carrier are essentially of the same width. In the event that the cleaning-element carrier is formed by cleaning-element carrier parts with a circular segment-shaped base surface, the clearance pattern in top view is configured in the form of a symmetrical star. The clearances between the individual cleaning-element carrier parts ensure that during a contour-shaping movement, in particular the tilting within the cleaning-element side surface formed in the initial position, adjacent edges of the cleaning-element carrier parts do not come into contact with one another.

According to a preferred embodiment of the invention, preferably one of the clearances, in particular, however, all clearances are filled with an elastic plastic material. This filling may partially extend radially outwards or completely radially outwards to the outer circumferential surface of the cleaning-element carrier so that at top view, no continuous clearances are provided any more between the cleaning-element carrier parts. It is in particular favorable that the above mentioned filling is formed by arms protruding star-shaped from the elastic plastic member, which arms protrude into the clearances between the cleaning-element carrier parts. The arms preferably extend approximately in the radial direction outwards up to a radial peripheral surface of the cleaning-element carrier and fill in the top view in particular between 10 and 30, preferably between 10 and 40, in particular between 10 and 50% of the clearance. It is very particularly preferred that the arms in top view to the center fill between a quarter and a third of the clearance. In the event that all clearances between the individual cleaning-element carrier parts are filled by the elastic plastic, the cleaning-element carrier as a whole has an increased rigidity and returning effect.

In particular, the elastic plastic for the filling is made of the same elastic plastic material as the returning means. In particular, the plastic filling the clearances forms a unitary component with the elastic plastic member, which forms the returning means, i.e. as a whole is preferably produced during injection-molding.

Individual or all of the cleaning-element carrier parts are preferably formed from a hard material in relation to the elastic plastic material, in particular hard plastic as PP (polypropylene), POM (polyoxymethylene), PBT (Polybutylenterephthalate) or PC (polycarbonate). The same applies for the base part. It is particularly preferred to produce the base part from a component other than the cleaning-element carrier parts. Thus, the body care brush is produced preferably at least in a two-component injection-molding process, preferably in a three-component or a multi-component injection-molding process.

According to the present invention, cleaning elements are preferably individual TPE elements or bristle bundles, which may each be provided alone on the individual cleaning-element carrier parts or respectively in combination with the other kind of cleaning elements (i.e. at least one, preferably all cleaning-element carrier parts bear TPE and/or bristle bundles). Every cleaning-element carrier part may bear one or more cleaning elements.

In the event that TPE cleaning elements are provided, it is preferred to form the same from the same plastic as the elastic plastic member (returning means). Furthermore, it is preferred to form these cleaning elements in the course of one single injection-molding step during the injection and forming of the returning means.

If at least partially bristle bundles are used as cleaning elements, they should either be mounted by means of an anchor in openings provided on the cleaning-element carrier parts or, alternatively, in the course of the production of the cleaning-element carrier part itself, they have already been produced directly held by insert-molding.

In the latter case, the cleaning-element carrier part in side view is configured to be thin in comparison to the mounting of the bristle bundles by means of an anchor.

In the event that the cleaning elements are mounted by means of anchors in the cleaning-element carrier part, the cleaning-element carrier part is first produced in a first injection-molding step with already precast cleaning-element receiving openings, into which subsequently, the bristle bundles are plugged and mounted by means of anchors therein. The mounting of the bristle bundles by means of anchors may either be carried out after connecting the cleaning-element carrier parts with the returning means or before.

In the direct insert-molding of the attachment-side ends of the bristle bundles, the cleaning-element carrier part is produced in a cavity into which the individual bristle bundles already protrude at the later provided positions within the cleaning-element carrier part. In this case, immediately after the injection-molding step for producing the cleaning-element carrier part, a cleaning-element carrier part cleaning-element unit is received.

The body care brush according to the invention preferably is an electrically operated brush, in which the complete brush head, at least, however, the cleaning-element carrier with the returning means and the base part coupled thereto is exchangeable as a unit. For this purpose, a hub for receiving a drive shaft, through which the cleaning-element carrier is driven, is preferably provided on the base part.

Alternatively, the invention also relates to a manual body care brush, in particular without any electrical control of the brush head. As far as a manual brush is concerned, the contour-shaping movement of the cleaning-element carrier parts results from pressure exerted by the user on the cleaning-element carrier while the brush is guided along the body surface. In particular, such a manual body care brush comprises a handle, which merges in one-piece into the brush head.

The handle usually is solid, injection-molded from plastic and realized in one-piece with the base part.

Preferably, the cleaning-element carrier is coupled to the electric drive via the base part in such a way that the cleaning-element carrier performs a rotating and/or oscillating movement.

The oscillating movement as well as the rotating movement are focused on the movement within the cleaning-element side surface.

Preferably, the brush according to the invention is a facial care brush. This is characterized by a larger diameter of the cleaning-element carrier in relation to a toothbrush, in top view at least in a direction within the cleaning-element side surface. Preferably, the diameter of the cleaning-element carrier is greater than 20 mm, particularly preferably greater than 25 mm, in particular greater than 30 mm. As it is preferably a brush for facial care, the outer diameter of the cleaning-element carrier is generally not more than 100 mm.

According to a further aspect, the invention moreover relates to a method for operating an electric body care brush. The operating method is preferably applied for the body care brush according to the invention and its specific embodiments. Firstly, cleaning by oscillating shall be performed, or alternatively by rotating the cleaning-element carrier.

Furthermore, the invention relates to a method for producing a body care brush.

Further preferred steps are explained in respect of the above described body care brush. Preferably, the cleaning-element carrier parts and the base part are simultaneously produced in different injection molds. In particular, the cleaning-element carrier parts and the base part are produced from different hard plastic components. These components having been produced in the two injection molds are then prepositioned to form a brush head assembly and are then combined with one another by means of elastic plastic in a further step by injection-molding. Thereby, the elastic plastic member is formed, which preferably connects the base part and the cleaning-element carrier parts with one another.

Regarding the production method according to the invention, the cleaning-element carrier parts are preferably one-piece injection-molded by injection-molding on the base part. Thereby, lands are usually left between the individual cleaning-element carrier parts and/or the base part. Such a base body is usually formed from a hard component and converted as a unit into a larger injection mold, in which an elastic plastic is injected between the cleaning-element carrier parts or between these and the base part. As far as the hindrance due to the land of the hard component between the individual parts is undesired, this land may be cropped prior to the injection so that the cleaning-element carrier parts are connected to one another or with the base part only via the elastic plastic, i.e. generally the thermoplastic elastomer. However, easier handling and production is achieved by leaving said lands in the component and being enveloped by the elastic, preferably soft-elastic plastic so that they do not influence the form of appearance of the finished product.

The elastic plastic member may form one-piece cleaning elements, which protrude from the elastic plastic member and accordingly, are provided between the cleaning-element carrier parts. After the injection-molding process, the cleaning-element carrier parts are preferably plugged with bristle bundles which are introduced into cleaning-element receiving openings being recessed at the cleaning-element carrier parts. Usually, every cleaning-element carrier part has a plurality of such receiving openings, in which a bristle bundle is held by an anchor.

Preferred embodiments and advantages of the inventions are derivable from the following description of an embodiment in combination with the drawing. Therein shows:

DESCRIPTION OF THE INVENTION

Figure 1A:
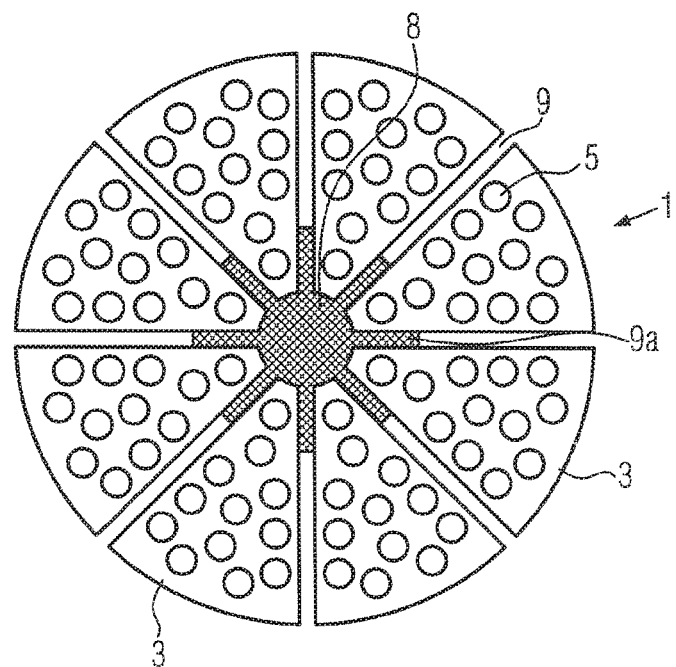
FIG. 1a a schematic top view on a brush head of a facial care brush.

FIG. 1a shows a brush head of a facial care brush in top view along a central axis perpendicular to a cleaning-element side surface. A cleaning-element carrier 1 is formed from eight cleaning-element carrier parts 3, which are aligned symmetrically to one another, and which each have a circular segment-like base surface. On a cleaning-element-side surface cleaning-element receiving openings 5 are provided, into which in the present case, single bristle bundles 6 are inserted and held (in the FIGURES, these cleaning elements 6 are only schematically illustrated).

In top view centered or centrally between the cleaning-element carrier parts 3, there is provided an elastic plastic member 8, which in top view essentially comprises a cylindrical form and from which star-shaped arms 9a branch out, which protrude into clearances formed between the cleaning-element carrier parts 3. An outer circumferential surface of the plastic part 8 corresponds to the geometry of an outer circumferential surface of the cleaning-element carrier 1.

Figure 1B:
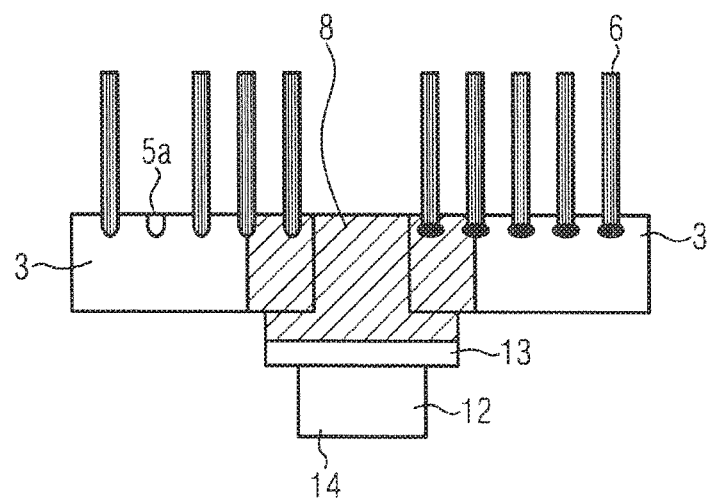
FIG. 1b a schematic side view of the embodiment according to FIG. 1a in a state being not in contact with the surface to be cleaned (initial position), wherein the two illustrated cleaning-element carrier parts are implemented with cleaning elements by means of different methods.

As can be seen in the side view illustrated in FIG. 1b, the individual cleaning-element carrier parts 3 are positively locked held from four sides (except for the cleaning-element side surface and the outer circumferential surface) by injection-molding the elastic plastic member 8.

The individual cleaning-element carrier parts 3 are held within the elastic plastic member 8 at their ends, which are slightly rounded in each case and point to the center (see FIG. 1a). The individual cleaning-element carrier parts 3 are spaced apart from one another by a clearance 9, which is partly filled by elastic plastic material. In other words, arms 9b branching out from the elastic plastic member 8 protrude in each case radially outwards into the respective clearance 9. The arms 9a only extend over about a quarter to a third of the radial length of the clearances 9.

The elastic plastic member 8 is essentially configured flush to the cleaning-element-side surface of the cleaning-element carrier 1 (see side view according to FIG. 1b). Essentially, all cleaning-element carrier parts 3 per se are also arranged in the same height with respect to the cleaning-element-side surface.

On the side opposite to the cleaning-element-side surface, the elastic plastic member 8 projects above exactly this side opposite to the cleaning-element-side surfaces and is connected to a base part 12, which has a disk-like flange 13, from which rearwardly a cylindrical connection flange 14 branches out directed toward a not shown brush base body.

Both, the cleaning-element carrier parts 3 and the base part 12 are made of a hard plastic component, while the elastic plastic member 8 is made of a soft plastic component, in the present case of TPE.

As schematically illustrated in FIG. 1, the cleaning-element carrier parts 3 are, thus, movably supported relative to one another. Due to a compressive force illustrated with the arrow F in FIG. 1c exerted (for example by a body part when the brush is used) to the (in this case right-hand side) cleaning element 3 and a counterforce exerted on the base part as indicated by the arrow G, a tilting of the respective cleaning-element carrier 1 and, thus, a contour-shaping of the surface to be cleaned during operation of the brush occurs. If the brush is moved over the region to be cleaned, in particular over the face, the cleaning-element carrier parts 3 move in such a way that the contour to be cleaned may be passed relatively precisely.

The embodiments shown in the Figures are produced in a three-component injection-molding process. The cleaning-element carrier parts 3 are formed from a first plastic component, the base part 12 from a second plastic component and the elastic plastic part 8 from a third component.

Preferably, the individual cleaning-element carrier parts 3 are produced in a first injection-molding station containing a first injection mold. In this first injection-molding station, in the present case, the mounting of the bristle bundles 6 to the cleaning-element carrier part 3 is also carried out simultaneously with the injection molding of the respective cleaning-element carrier part. The thus precast parts are subsequently transferred to a second injection-molding station and are provided with the elastic plastic member 8 in an injection device provided therein, which, as explained in the general description, is produced in the course of the injection-molding in the second station and combined with the cleaning-element carrier parts 3 and the base part 12.

The base part 12 is formed by means of injection-molding in a third station and simultaneously is connected to the elastic plastic member by means of injection in the second injection-molding station.

In the second station, the cleaning-element carrier parts 3 together with the bristle bundles 6 attached thereto and the base part 12 are held in relation to one another in the alignment predetermined in the non-use state of the brush and are held within a cavity, into which subsequently an elastic plastic, in the present case TPE, is injected in order to form the elastic plastic member 8. Subsequently, the thus precast brush head is released from the third station of the injection-molding line.

In the embodiment shown in FIG. 1b, two different kinds of mounting of bristle bundles 6 serving as cleaning elements are shown. On the left-hand side in FIG. 1b, the bristle bundles are mounted by means of anchoring technology, whereas the bristle bundles 6 shown on the right-hand side in FIG. 1b are held by means of insert-molding at their attachment-side ends. In this case, the bristle bundles are mounted thereon, while the cleaning-element carrier part is produced in the course of injection-molding.

On the right-hand side in FIG. 1b, there is further shown a cleaning-element receiving opening 5a, which is not yet filled with bristle bundles, into which a not shown anchor for mounting the bristle bundles is jetted.

Usually, both mounting methods are used alternatively so that the cleaning-element carriers either contain only bristle bundles 6, which are mounted by means of anchor technology or merely bristle bundles 6, which are mounted by means of injection-molding technology by insert-molding.

Figure 1C:
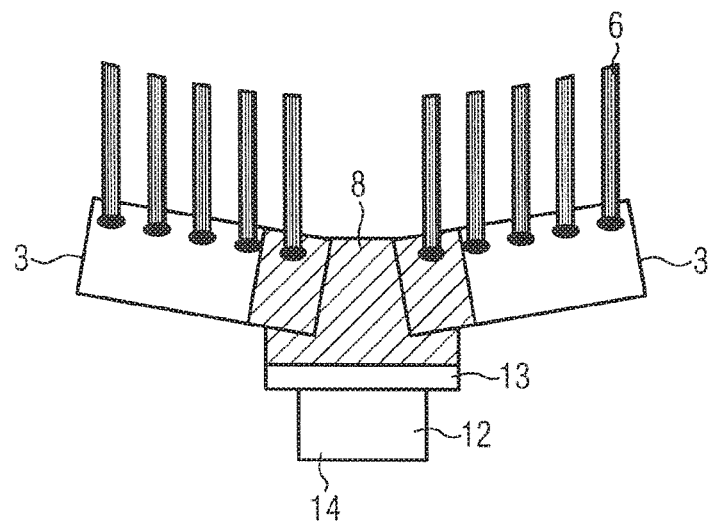
FIG. 1c a schematic side view of a second embodiment with a concavely configured cleaning element carrier.

FIG. 1c shows an embodiment, in which unlike in the embodiment shown in FIGS. 1a, b, and e, the cleaning-element carrier 1 in its initial position is not formed in a planar manner, but has a concave geometry. Individual cleaning-element carrier parts 3 are per se formed in a planar manner, however, they are held in a tilted manner in the elastic plastic member 8, i.e. already during the insert-molding, they are aligned in a tilted manner to one another. The bristle bundles 6 are each aligned with a central axis, which is not shown in the Figures and which runs perpendicularly through the elastic plastic member 8 in the plane of projection. Therefore, the cleaning-element receiving openings 5 are aligned diagonally in the cleaning-element carrier parts 3. All bristle bundles 6 are held by direct insert-molding and are not mounted in the respective cleaning-element carrier part 3 by means of anchor technology.

Figure 1D:
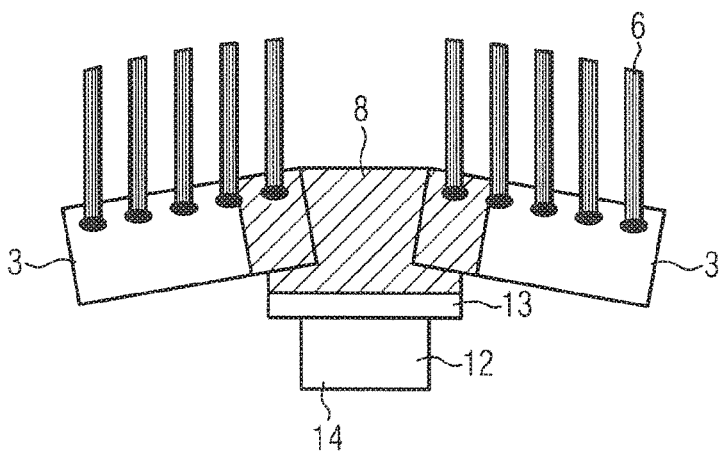
FIG. 1d a schematic side view of a third embodiment with a convexly configured cleaning element carrier.
Figure 1E:
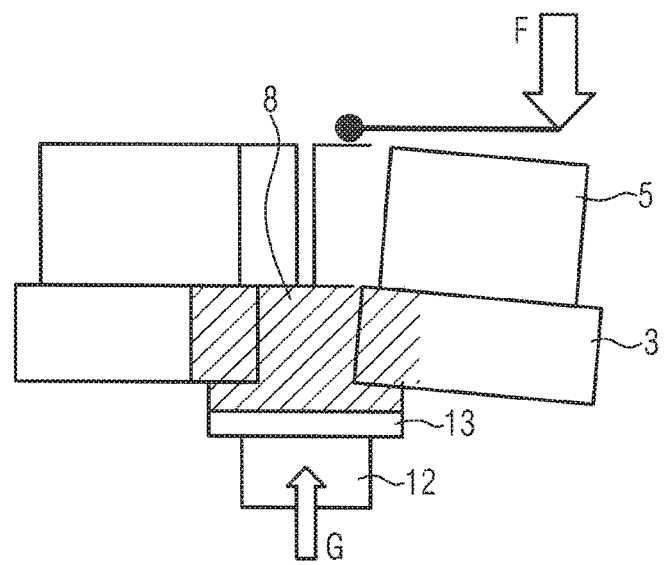
FIG. 1e a side view of the embodiment shown in FIG. 1a being in contact with a surface to be cared (operating position).

In FIG. 1d, a further embodiment is shown. In contrast to the embodiment shown in FIG. 1c, the cleaning element carrier 1 has a concave geometry in its initial position.

In the embodiments shown in FIG. 1c or d, the individual cleaning-element carrier parts tilt from their initial position illustrated there into the working position in order to come into contact with the surface to be cleaned.

LIST OF REFERENCE SIGNS

1 Cleaning-element carrier
3 Cleaning-element carrier part
5, 5a Cleaning-element receiving opening
6 Bristle bundle/cleaning elements
8 elastic plastic/returning means
9 Clearance
9a Arm/pad
12 Base part
13 Disk-like flange
14 Connection flange

The invention claimed is:

1. A body care brush having a brush head, which contains a cleaning-element carrier, which bears cleaning elements, wherein
   the cleaning-element carrier is formed by at least two cleaning-element carrier parts, which are movably supported in relation to each other and which bear cleaning elements and that a returning means is provided between the cleaning-element carrier parts, by means of which returning means the cleaning-element carrier parts are coupled to a base part, wherein the base part is arranged centrally with respect to the cleaning-element carrier and on a side of the cleaning-element carrier facing away from the cleaning elements,
   wherein the returning means is formed of an elastic plastic member, to which the cleaning-element carrier parts are attached,
   wherein the cleaning-element carrier parts each comprise a circular segment-shaped base surface and the cleaning-element carrier parts form an essentially circular cleaning-element carrier,
   wherein the cleaning-element carrier parts are spaced apart from one another via a clearance, and
   wherein the elastic plastic member fills 10%-50% of the clearance in a radial direction.

2. The body care brush according to claim 1, wherein the elastic plastic member is injected to the cleaning-element carrier parts.

3. The body care brush according to claim 1, wherein at least one cleaning element is formed as a TPE element or at least one cleaning element is formed as bristle bundle.

4. The body care brush according to claim 1, wherein at least one cleaning-element carrier part is formed of a base body, which is produced by means of injection-molding and which is provided with at least one cleaning-element receiving opening, and one of the cleaning elements is mounted via an anchor in the cleaning-element carrier part.

5. The body care brush according to claim 1, wherein at least one cleaning element is secured to the cleaning-element carrier by plastic material of the cleaning-element carrier injection molded around an attachment-side end of the at least one cleaning element.

6. The body care brush according to claim 1, wherein a hub is provided at the base part for receiving a drive shaft.

7. The body care brush according to claim 1, wherein an electric drive for rotating or oscillating movement of the cleaning-element carrier is assigned to the brush head, which is connected to the base part.

* * * * *